Nov. 28, 1933.   G. B. WATKINS   1,937,396
LAMINATED GLASS AND PROCESS FOR PRODUCING THE SAME
Filed July 26, 1929
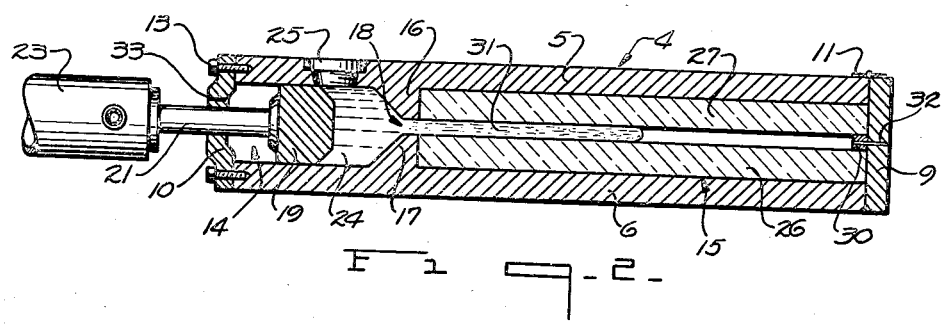
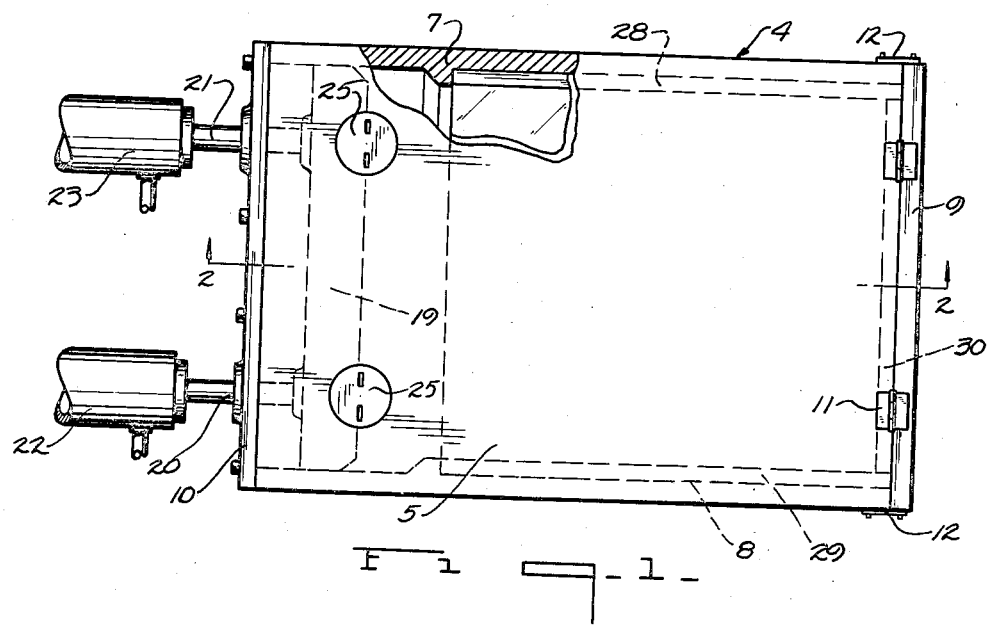
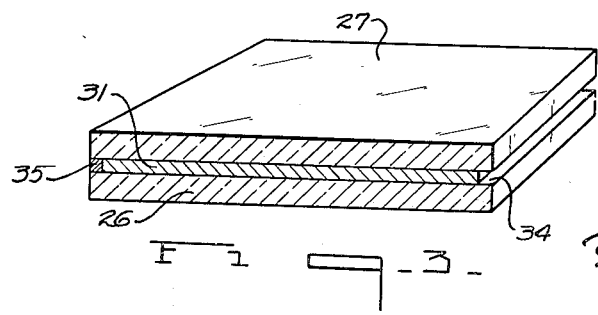
Inventor
George B. Watkins
Frank Fraser
Attorney Patented Nov. 28, 1933

1,937,396

UNITED STATES PATENT OFFICE 1,937,396

LAMINATED GLASS AND PROCESS FOR PRODUCING THE SAME

George B. Watkins, Toledo, Ohio, assignor to Libbey-Owens-Ford Glass Company, Toledo, Ohio, a corporation of Ohio Application July 26, 1929. Serial No. 381,190

12 Claims. (Cl. 49—81)

The present invention relates to laminated glass and to a process for producing the same.

Laminated or composite glass is commercially called in the art "non-shatterable" or "non-scatterable" glass. Such glass is ordinarily produced by uniting two or more sheets or plates of glass and one or more non-brittle membranes to form a composite structure. It is customary to use a non-brittle sheet of cellulose composition between two sheets of glass and to join such non-brittle material to the glass sheets by means of some form of adhesive or the like. The value of such a composite sheet of glass is dependent to a considerable degree upon the quality and permanency of the bond between the several elements. It is essential that the bond be such that one or more of the glass sheets can be broken or shattered without separating from the non-brittle material.

In the manufacture of laminated glass it has heretofore been customary to interpose a sheet of non-brittle material between two sheets of glass and then place the assembled sheets within a suitable press wherein such sheets were subjected to both heat and pressure to cause a uniting thereof to form a composite structure, after which the pressure was released and the sheets permitted to cool. However, the application of the heat and pressure to the assembled sheets of material sometimes results in the setting up of strains in the finished product which is of course, an undesirable condition.

The object of this invention is to provide an improved process whereby the production of laminated glass can be carried out in a rapid and efficient manner more conveniently and economically than heretofore, and in such a manner that the creating or setting up of strains in the finished sheet will be eliminated.

Another object of the invention is to provide an improved process for producing laminated glass wherein the glass sheets are adapted to be held in spaced relation and a non-brittle membrane formed therebetween and united thereto by forcing the plastic material from which the membrane is produced under pressure between the glass sheets.

A further object of the invention is to provide novel apparatus for carrying out the improved process and which apparatus includes means for supporting and maintaining two or more substantially horizontally arranged sheets of glass in spaced relation, together with means for extruding a suitable non-brittle composition under pressure between the two sheets of glass.

Other objects and advantages of the invention will become more apparent during the course of the following description when taken in connection with the accompanying drawing.

In the drawing forming a part of this application and wherein like numerals are employed to designate like parts throughout the same, Fig. 1 is a top plan view of apparatus provided by the present invention, Fig. 2 is a section taken substantially on line 2—2 of Fig. 1, and Fig. 3 is a perspective sectional view of a sheet of laminated glass.

Referring to the drawing, the apparatus employed in the production of the laminated sheet comprises a casing or housing designated in its entirety by the numeral 4 and including the top and bottom spaced, substantially horizontal members 5 and 6, side members 7 and 8, and the end members 9 and 10. The end member 9 is hinged to the top member 5 by the hinges 11, and is removably secured in closed position by means of latches or the like 12 carried by bottom member 6 so that upon unfastening of the latches the end member 9 can be swung upwardly upon hinges 11 to permit the insertion of the sheets of glass to be joined into the housing or the removal of the finished composite sheet therefrom. The end member 10 is secured in place by removable screws or the like 13.

The interior of the housing 4 is divided into two separate compartments or chambers 14 and 15 separated by the superimposed ribs 16 and 17 which extend transversely of the housing, the rib 16 depending from the top 5 while the rib 17 is carried by the bottom 6. The ribs 16 and 17 are spaced from one another to provide a transverse slot 18 therebetween. Mounted within the chamber 14 is a ram 19 carried at the forward ends of plungers 20 and 21 which extend through end member 10 and operate within cylinders 22 and 23 respectively. The chamber 14 is adapted to receive the non-brittle solution 24 which is to form the inner membrane between the glass sheets and this material may be introduced into said chamber through suitable openings in the top 5 normally kept closed by the removable caps or cover plates 25.

When it is desired to produce a sheet of laminated glass with the apparatus herein provided, the sheets of glass 26 and 27 to be joined are first positioned within the compartment 15 in spaced superimposed relation. To permit the placing of the glass sheets in proper position within the housing, the end member 9 is first swung upwardly upon the hinges 11 after which the glass sheet 26 is inserted within the chamber 15 so as to abut the rib 17 and rest upon the bottom 6. Suitable spacing elements or strips 28 and 29 are then placed upon the glass sheet 26 along and parallel with the opposite side edges thereof in position to abut the sides 7 and 8, after which the glass sheet 27 is inserted within the housing so that it will rest upon the spacing strips 28 and 29 and will abut the rib 16. After the upper sheet has been properly positioned, a third spacing element or strip 30 is arranged transversely between the sheets at the outer edges thereof and the end member 9 is then lowered and secured closed by the latches 12. The thickness of the spacing strips 28, 29 and 30 maintain the glass sheets spaced from one another a distance equal to the thickness of the non-brittle membrane desired.

The plungers 20 and 21 are then operated within cylinders 22 and 23 to draw the ram 19 outwardly, after which the cover plates 25 are removed and the non-brittle material poured therein. The cover plates 25 are then replaced and the plungers operated to force the ram 19 inwardly with the result that the non-brittle material will be forced from the chamber under pressure through the slot 18 and into the space between the glass sheets 26 and 27 as indicated at 31. The material forming the membrane will adhere to and unite the two sheets of glass to form a composite structure. After the membrane has been allowed to set to the desired extent, the end member 9 is again swung upwardly to permit the removal of the composite sheet. To permit the air within chamber 15 to be ejected therefrom upon forcing of the non-brittle material between the sheets, one or a plurality of air-holes or vents 32 may be formed in end member 9 in registry with similar air-holes or vents in the spacing strip 30. One or more air-holes 33 may also be provided in end member 10 communicating with chamber 14. In order to prevent the non-brittle material from adhering to the spacing strips, the inner surfaces of said strips may be covered with a coating or film of mercury or some other suitable material.

The non-brittle material 24 may be of any suitable composition such as cellulose acetate with a suitable liquid plasticizer. It is also desirable that the apparatus in which the laminated sheet is produced be heated and it is further desirable that the sheets be heated to a temperature approximately to the melting point of the plastic material used, since this will facilitate the obtaining of a good and efficient bond between the membrane and the glass sheets. Due to the provision of the spacing strips 28, 29 and 30, it will be noted that a recess or channel will be left at the opposite sides and outer end of the laminated sheet. A similar recess or channel can be formed at the inner end of the sheet by properly controlling the amount of non-brittle material forced in between said sheets. By so doing, a channel 34 as illustrated in Fig. 3 will be left entirely around the edges of the sheet in which a sealing material 35 may then be arranged.

From the above, it will be apparent that with the use of the apparatus herein provided, the laminated sheet may be fashioned rapidly and conveniently without the use of large and expensive presses with the result that the glass can be made more economically than in the past. Furthermore, by forming the inner non-brittle membrane in the manner described, the creating or setting up of strains in the finished sheet will be avoided while a good and efficient bond will be had.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for producing laminated glass, comprising a housing including a chamber for receiving two sheets of glass to be joined and a second chamber for receiving a plastic material, means for maintaining the glass sheets within the first mentioned chamber spaced from one another, and means for forcing the material from the second member chamber under pressure between the glass sheets.

2. An apparatus for producing laminated glass, comprising a housing including a chamber for receiving two sheets of glass to be joined and a second chamber for receiving a plastic material, means for maintaining the glass sheets within the first mentioned chamber spaced from one another, and means operating within the second mentioned chamber for forcing the plastic material therefrom under pressure between the glass sheets to form a non-brittle membrane.

3. An apparatus for producing laminated glass, including means for supporting two sheets of glass in a substantially horizontal position, means for maintaining said sheets spaced from one another, means containing a plastic material, and means for forcing the plastic material under pressure between the glass sheets to produce a non-brittle membrane.

4. The process of producing laminated glass consisting in arranging two sheets of glass in spaced relation, and in then forcing a material in plastic condition under pressure between the glass sheets to fill the space therebetween and to form a tough transparent plastic membrane adherent to the inner surfaces of the glass sheets.

5. The process of producing laminated glass consisting in arranging two sheets of glass in spaced relation, and in then forcing a material in plastic condition and substantially devoid of excess solvent under pressure between the glass sheets to fill the space therebetween and to form a tough transparent plastic membrane adherent to the inner surfaces of the glass sheets throughout its entire area.

6. The process of producing laminated glass consisting in arranging two sheets of glass in spaced relation, and in then forcing a heated material in plastic condition and substantially devoid of excess solvent under pressure between the glass sheets to fill the space therebetween and to form a tough transparent plastic membrane adherent to the inner surfaces of the glass sheets.

7. The process of producing laminated glass consisting in arranging two sheets of glass in spaced relation, then heating the glass sheets, then forcing a material in plastic condition and substantially devoid of excess solvent under pressure between the heated glass sheets to fill the space therebetween and to form a tough transparent plastic membrane adherent to the inner surfaces of the glass sheets, and in then cooling the composite structure thus formed.

8. The process of producing laminated glass consisting in arranging two sheets of glass in spaced relation, then heating the glass sheets, then forcing a heated material in plastic condition and substantially devoid of excess solvent under pressure between the heated glass sheets to fill the space therebetween and to form a tough transparent plastic membrane adherent to the inner surfaces of the glass sheets, and in then cooling the composite structure thus formed.

9. An apparatus for producing laminated glass comprising means for holding two sheets of glass in spaced relation, and means for forcing a material in plastic condition under pressure between the glass sheets to form a tough transparent plastic membrane adherent to the inner surfaces of both glass sheets throughout its entire area.

10. An apparatus for producing laminated glass comprising means for holding two sheets of glass in spaced relation, means for holding a material in plastic condition, said means having an outlet in alignment with the space between the glass sheets, and means for forcing the material under pressure from said second mentioned means through the outlet thereof and into the space between the glass sheets to form a tough transparent plastic membrane adherent to the inner surfaces of both glass sheets throughout its entire area.

11. An apparatus for producing laminated glass comprising means for holding two sheets of glass in spaced relation, a receptacle for containing a material in plastic condition, said receptacle having an outlet in alignment with the space between the glass sheets, and means for applying pressure to the said material in the receptacle to force it through the outlet and into the space between the glass sheets to form a tough transparent plastic membrane adherent to the inner surfaces of both glass sheets throughout its entire area.

12. An apparatus for producing laminated glass comprising means for holding two sheets of glass in spaced relation, a receptacle for containing a material in plastic condition, said receptacle having an outlet in alignment with the space between the glass sheets, means for applying pressure to the said material in the receptacle to force it through the outlet and into the space between the glass sheets to form a tough transparent plastic membrane adherent to the inner surfaces of both glass sheets throughout its entire area, and means for controlling the temperature of the glass sheets and plastic material.

GEORGE B. WATKINS.